Feb. 12, 1924.　　　　　　　　　　　　　　　　1,483,275
E. J. BRANDT
RESILIENT WHEEL
Original Filed Nov. 11, 1916　　2 Sheets-Sheet 1

Feb. 12, 1924.

E. J. BRANDT

RESILIENT WHEEL 1,483,275

Original Filed Nov. 11, 1916    2 Sheets-Sheet 2

Patented Feb. 12, 1924.

1,483,275

UNITED STATES PATENT OFFICE.

EDWARD J. BRANDT, OF WATERTOWN, WISCONSIN.

RESILIENT WHEEL.

Application filed November 11, 1916, Serial No. 130,776. Renewed June 30, 1923.

*To all whom it may concern:*

Be it known that I, EDWARD J. BRANDT, a citizen of the United States, and resident of Watertown, in the county of Jefferson and State of Wisconsin, have invented certain new and useful Improvements in Resilient Wheels; and I do hereby declare that the following is a full, clear, and exact description thereof.

The present invention relates to new and useful improvements in resilient wheels, more particularly of that type including a substantially rigid body having a series of spring urged plungers projecting from the periphery thereof to take up the operative shocks of the wheel.

A considerable disadvantage of resilient wheels of this type heretofore provided has been the lack of a sufficient continuity and freedom of resilient action due to the limited number of spring plungers heretofore employed, and to the relatively great longitudinal spaces between the plungers or groups of plungers of the wheel.

It is in general the object of the present invention to simplify and otherwise improve the structure, and to increase the efficiency of resilient wheels of this type and more particularly with respect to the recited disadvantages of such wheels, it is an important object to provide an arrangement whereby a relatively large number of spring plungers may be utilized in a wheel of general conventional dimensions, and whereby such plungers may be so arranged as to progressively yield in a continuous uniform cycle as the wheel revolves, to eliminate the jerky action incidental to heretofore provided wheels of this type.

A further object resides in the provision of a tread arrangement whereby a maximum freedom of movement of the plungers is permitted, and whereby the plungers are entirely housed to prevent admission of dirt or other foreign matter to their bearing portions.

A still further object resides in the provision of an arrangement whereby compressing tendency at one side of the wheel is transmitted transversely of the wheel to thus procure a proper distribution of the load strain on the plungers.

A still further object resides in the provision of a resilient wheel embodying the foregoing advantages which is of such simple construction as to permit a most ready manufacture and assembly of the parts, and which is further of such construction as to distribute the various operating strains in a manner permitting a maximum economy of material.

With the above and other objects and advantages in veiw, the invention resides more particularly in the novel combination, formation and arrangement of parts hereinafter described and pointed out in the appended claims.

Referring now more particularly to the accompanying drawings, the embodiment of my invention therein shown includes a wheel hub 5 of conventional design from which radiate a series of spokes 6 carrying a felly 7.

Figure 5:
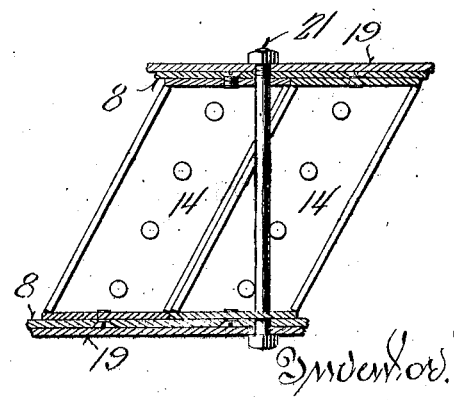
Figure 5 is a sectional view indicated in a general manner by the line 5—5 of Figure 3.
Figure 2:
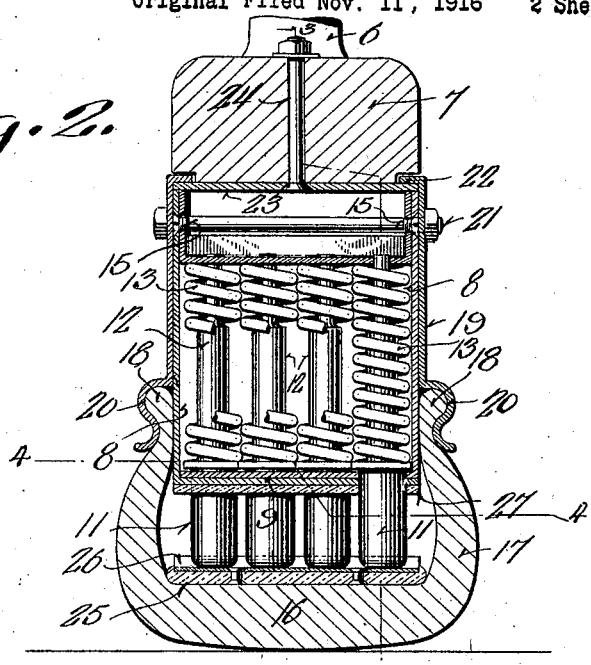
Fig. 2 is a transverse sectional view through the tire portion of the wheel with parts broken away to more clearly illustrate some of the detailed construction.
Figure 3:
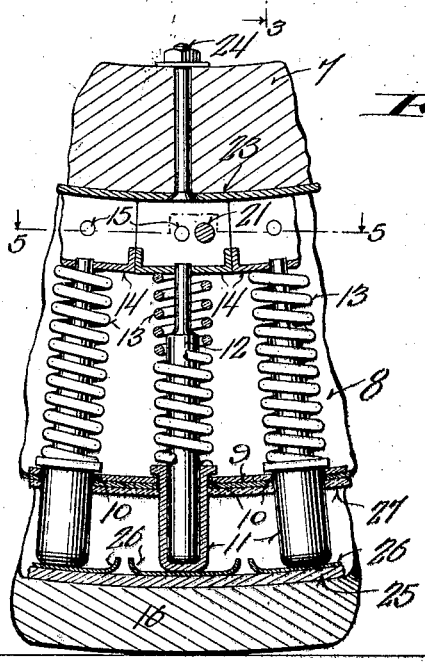
Fig. 3 is a fragmentary longitudinal section through the tire portion of the wheel taken generally on line 3—3 of Fig. 2.

The resilient means of my wheel is housed within a casing including an inner rigid portion and an outer flexible portion and the rigid portion comprises a pair of annular side plates 8 carried by and projecting from the felly and having at their outer peripheral portions inturned overlapping flanges which co-act to form an annular wall 9, the thickness of which is thus double the thickness of the walls formed by the side plates 8. Formed in the peripheral wall 9 are transverse series of openings 10 and the openings of each series are arranged in echelon, and the series are arranged in parallel relation whereby the longitudinal distance between the opposite endmost openings of adjacent series is equal to the longitudinal distance between the openings of each series. Slidably mounted in each of the openings 10 is a plunger thimble 11, preferably formed of relatively hard metal, and having its mouth portion disposed inwardly of the peripheral wall and laterally turned to form a spring seating flange. Engaged in each of the thimbles is a guide rod 12, and coiled on the guide rods 12 are expansible springs 13. For guiding the inner ends of the rods 12, which are preferably reduced, and for procuring a desired tension of the springs 13, a spring compression plate 14 is provided for each transverse series of rods 12, and is apertured to slidably receive the reduced ends thereof. These plates are secured to the inner portions of the side plates 8 by screws 15 or other fastening means passed through the plates 8 and through the laterally turned ends of the said plates 14, the side edges of said plates being also preferably turned inwardly with respect to the plunger rods, and disposed in abutting relation. By reason of the arrangement in echelon of the series of rods 12, the plates 14 are inclined with respect to the casing, as shown more particularly in Figure 5.

The major portions of the plunger thimbles 11 project outwardly of the annular wall 9, and the flexible portion of the tire casing serves to house the projected thimbles in a manner permitting a free yielding movement thereof. This flexible casing portion comprises a tread wall 16 and side walls 17 and is similar in general shape to a pneumatic tire casing, being provided at the free reduced edges of its side walls with annular enlargements 18. The side walls 17 overlap the inner wall plates 8, and to secure said side walls thereto annular fastening plates 19 are secured to the plates 8 and are offset adjacent their outer portions to provide annular channels 20 adapted to interlockingly receive the enlargement of the flexible casing sides 17 and to clamp said sides to the plates 8.

The plates 19 are secured to the plates 8 by bolts 21 passed transversely through the inner portions thereof, it being noted that the inner portions of the plates 8 are braced by the spring compression plates 14. To secure the plates 8 to the felly 7, the inner peripheral edges of the plates 19 are extended inwardly of the plates 8 and provided with inturned flanges 22 which engage interlockingly with the inner edge portions of an annular plate 23 secured on the felly by bolts 24 passed therethrough and through the plate, the side edges of the felly being cut away to receive the flanges 22. By this arrangement an exceedingly simple general structure is procured, permitting a most ready assembly of parts.

The tread wall 16 of the outer casing portion is relatively flat, and disposed on the inner face of this tread wall is an annular band 25 preferably formed of leather and having secured to its inner face transverse shoe plates 26, each adapted to form a bearing seat for a series of plungers, and being inclined with respect to the sides of the casing to correspond to the arrangement in echelon of said plungers. The side edges of these shoe plates are inwardly directed to form stop flanges limiting relative circumferential movement of the tread portion of the outer casing with respect to the plungers, it being noted that in operation some circumferential movement of the tread surface would occur due to the flexible nature of the outer casing portion, which is preferably formed of rubber in the general manner of the pneumatic tire casing.

Figure 1:
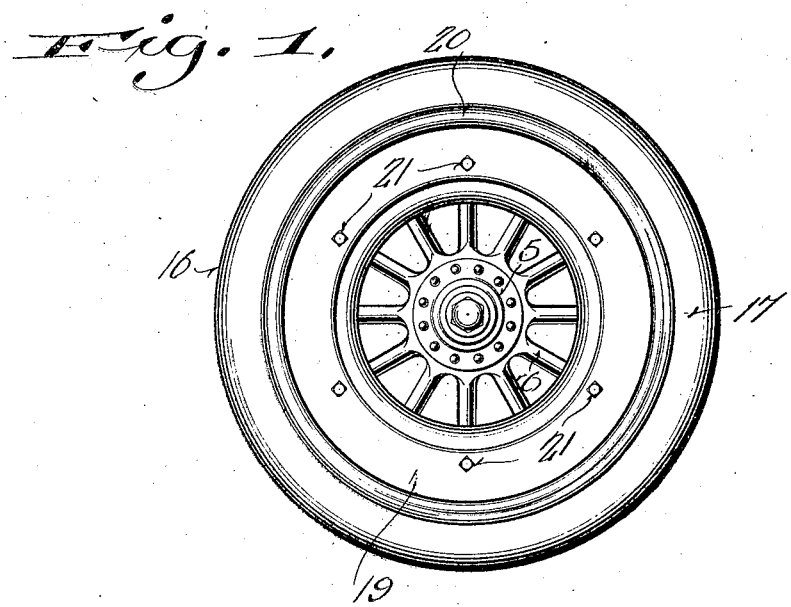
Figure 1 is a side elevation of a resilient automobile wheel constructed in accordance with the present invention.
Figure 4:
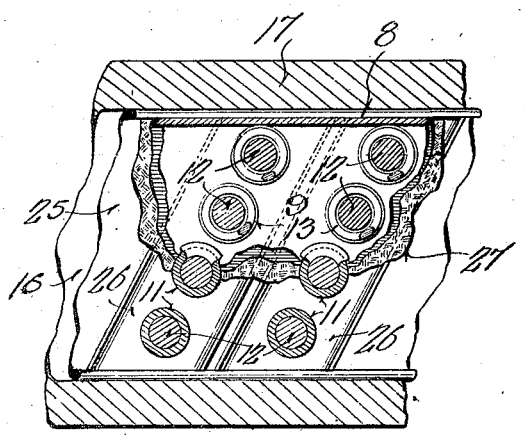
Fig. 4 is a fragmentary horizontal section taken through the tire on line 4—4 of Fig. 2.

As shown more particularly in Figure 4, the arrangement in echelon of the series of plungers with a corresponding advancement between the rearmost and foremost plungers of adjacent series in keeping with the advancement between the individual plungers of each series permits a maximum number of said plungers in a wheel of conventional dimensions, and further provides an arrangement whereby the plungers are, upon rotation of the wheel, progressively yieldable in a uniform manner to provide a practically continuous yielding action. By this arrangement of parts it will be observed that a relatively large number of plungers are retracted at the ground engaging portion of the wheel which successively decrease in resilient tension from the central point of ground engagement of the wheel. By the provision of the transverse shoes 26 associated with the series of plungers, compressing tendency at one side of the wheel is distributed transversely of the wheel, this advantage being in addition to the slidable bearing function of said shoes. The entire structure of my wheel is designed with a view to a most ready manufacture and assembly of parts. In assembling the wheel the side wall plates 8 are disposed in proper relation with their flanges overlapping to form the annular wall 9. The thimble receiving openings 10 are then formed in this wall and the thimbles disposed therein. The guide rods 12 are then inserted in the thimbles and the springs 13 placed on said rods. The spring compression plates 14 are then inserted between the plates 8 and secured thereto with their apertures receiving the ends of the rods 12, thus placing and holding the springs 13 under desired compression. The outer casing portion is then applied and by the securement of the plates 19, said portion is simultaneously fastened to the plates 8 and the entire structure fastened to the wheel by the interlocking engagement of the flanges 22 with the plate 23.

Entire detachment of the tire from the felly may thus be procured by removing the plates 19.

It is noted that the greatest strain of operation occurs at the thickened annular wall 9, and to procure a proper lubrication of the bearings afforded by the openings 10, an annular band 27 of wicking or similar material is disposed about said wall and apertured to receive the thimble plungers 11, this wicking being saturated with oil. It is noted that the bearings afforded by the apertures of the plates 14 serve merely as a guide for the rods 12 and receive but very little of the load strain of operation of the wheel.

By reason of the transverse arrangement of the series of plungers and of the consequent flattened formation of the tread wall 16 of the outer casing portion, a maximum ground gripping surface is provided by the present wheel, particularly in view of the yieldable nature of the casing, and thus tendency to skidding of the wheel is prevented.

While I have described an inner rigid and an outer flexible casing portion, it is noted that each of these portions comprises substantially an entire casing and each may be so described in the event of a possible elimination of the other portion as a casing, it being appreciated that although I have shown and described a preferred embodiment of my invention, various other embodiments thereof may be resorted to to meet differing conditions of use without departing from the spirit of my invention as interpreted by the accompanying claims.

What is claimed:

1. A resilient wheel including a felly and transverse series of yieldable plungers carried thereby, each series comprising more than two plungers and the plungers of each series being arranged in echelon with the rearmost and the foremost plungers of adjacent series spaced apart circumferentially of the wheel a distance equal to the circumferential advancement between the individual plungers of each series whereby all of the plungers are equally spaced longitudinally of the felly to uniformly progressively yield upon revolution of the wheel.

2. A resilient wheel including a felly, spring urged plungers carried thereby, a flexible casing disposed about the plungers, bearing shoes carried by the tread portion of the casing and overlying the plunger ends for preventing any engagement of the plunger ends with the casing and means independent of the casing for limiting outward movement of the plungers.

3. A resilient wheel including an annular casing, transverse series of bearing portions in the outer peripheral portion of the casing, plungers slidable in said bearing portions and transverse spring compression plates independently secured at the inner peripheral portion of the casing, said plates being apertured to slidably receive the plungers.

4. A resilient wheel including an annular casing, transverse series of bearing portions in the outer peripheral portion of the casing, plungers slidable in said bearing portions and transverse spring compression plates independently secured to the inner peripheral portion of the casing, said plates being apertured to slidably receive the plungers, each transverse series of plungers being arranged in echelon and said compression plates being correspondingly inclined with respect to the sides of the casing.

5. A resilient wheel including a felly, and transverse series of yieldable plungers carried thereby, each series being arranged in echelon with the rearmost and foremost plungers of adjacent series spaced apart circumferentially of the wheel a distance equal to the circumferential advancements between the individual plungers of each series whereby all of the plungers are equally spaced apart longitudinally of the felly to uniformly progressively yield upon the revolution of the wheel, and a flexible casing disposed about the plungers.

6. A resilient wheel including a felly, outwardly projecting annular plates carried thereby, inturned lapped flanges at the outer portions of the plates and yieldable plungers slidably passed through said lapped flanges of the plates.

7. A spring wheel including a felly, outwardly projecting annular plates carried thereby, inturned lapped flanges at the outer portions of the plates, plungers slidably passed through said lapped flanges of the plates, springs surrounding the inner portions of said plungers and spring compression plates secured to the first named plates and apertured to receive the inner ends of the plungers.

8. A spring wheel including a felly provided with annular recesses in its sides, an annular inner casing portion carried by the felly, spring plungers housed within the casing and projecting from the outer peripheral wall thereof, a flexible casing disposed about the projecting ends of the plungers with its inner edge portions projecting inwardly of said peripheral wall, annular plates on the side walls of the first named casing portion for securing the flexible casing portion thereto and inturned flanges on said annular plates engageable in the recesses of the felly.

9. A resilient wheel including an inner rigid casing portion composed of annular side plates, an annular portion bridging said side plates, a flexible outer casing, and transverse series of yieldable plungers slidably passing through said bridging portion and exerting pressure on the outer casing.

10. A resilient wheel including an inner rigid casing portion, a flexible outer casing portion, a rigid annular wall between said portions and yieldable plungers slidably passed through said wall, and a lubricating band disposed about said annular wall.

11. A spring wheel including a felly, an inner rigid casing portion, yieldable plungers mounted therein and projecting therefrom, an outer flexible casing portion surrounding the projected ends of the plungers a flexible band within the outer casing portion, and bearing shoes for the plungers secured to said band.

12. A resilient wheel including an annular casing, series of bearing portions in the outer peripheral portion of the casing, plungers slidable in said bearing portions and spring compression plates independently secured at the inner peripheral portion of the casing.

13. A resilient wheel including an annular casing, series of bearing portions in the outer peripheral wall of the casing, plungers slidable in said bearing portions, and spring compression plates independently secured at the inner peripheral portion of the casing, said plates being apertured to receive the inner ends of the plungers.

14. A resilient wheel including a felly. a U-shaped casing secured to said felly with its open side arranged inwardly, series of bearing portions in the outer peripheral wall of the casing, plungers slidable in said bearing portions, and spring compression plates independently secured at the inner peripheral portion of the casing, said plates being apertured to slidably receive the inner ends of the plungers.

15. A resilient wheel including a felly, transverse series of yieldable plungers carried thereby, each series comprising more than two plungers, a flexible casing disposed about the outer portions of the plungers, and transverse shoes carried by the casing against which the plunger ends bear.

16. A resilient wheel including a felly, outwardly projecting plates carried thereby, inturned flanges at the outer portions of the plates, and yieldable plungers slidably mounted through said flanges.

17. A resilient wheel including an annular casing provided with a series of peripheral opening therein, yieldable plungers arranged within said casing and extending through the peripheral openings, a flexible casing disposed about the exposed plunger ends, and means for securing the flexible casing to the side walls of the annular casing.

18. A resilient wheel including an annular casing, yieldable plungers arranged within and extending through the peripheral portion of the casing, means for limiting the outward movement of the plungers, a flexible casing disposed about the exposed plunger ends, and means for securing the flexible casing through the side walls of the annular casing.

19. A resilient wheel including a felly transverse series of yieldable plungers carried thereby, each series comprising more than two plungers arranged in echelon the rearmost plunger of each series being advanced circumferentially of the wheel relative to the foremost plunger of the adjacent series and a flexible casing disposed about the ends of the plungers.

20. A spring wheel including a felly, an annular inner casing portion carried by the felly, yieldable plungers housed within the casing and projecting through the outer peripheral wall thereof, a flexible casing disposed about the projecting ends of the plungers with its inner edge portions projecting inwardly of said peripheral wall and annular plates on the side walls of the first named casing portion for securing the flexible casing thereto said plates having offset inner edges secured to the felly.

21. A spring wheel including a felly, an annular inner casing portion carried by the felly, yieldable plungers housed within the casing and projecting from the outer peripheral wall thereof, a flexible casing disposed about the projecting ends of the plungers with its inner edge portions projecting inwardly of said peripheral wall, and means for securing said inner edge portions to the side walls of the first named casing portion.

22. A resilient wheel comprising a flexible tread portion, yieldable plungers therein exerting outward pressure thereon, and a casing for the spring urging portions of said plungers, said casing including centering sections for said spring urged portions and said sections being separately removable without releasing the others to permit access to the casing and parts thereof.

23. A resilient wheel having as a unit removable intact from the wheel an annular casing, yieldable plungers arranged within and projecting through the peripheral portion of the casing, a flexible casing disposed over the projecting ends of the plungers, and means for securing the flexible casing to the side portions of the annular casing.

24. A resilient wheel having as a unit removable intact from the wheel an annular casing providing inner, outer and side walls, a plurality of yieldable plungers projecting through the outer wall of the casing, a flexible casing disposed over the projecting ends of the plungers, and means for securing the flexible casing to the annular casing.

25. A resilient wheel having as a unit removable intact from the wheel, a casing providing inner, outer and side walls, yieldable plungers therein projecting through the outer wall thereof, a flexible casing disposed over the projecting ends of the plungers, and a means for simultaneously securing the flexible casing to the unit and the latter to the felly.

In testimony that I claim the foregoing I have hereunto set my hand at Watertown, in the county of Jefferson and State of Wisconsin, in the presence of two witnesses.

EDWARD J. BRANDT.

Witnesses:
ANNE N. MURPHY,
ROBERT DENT.